Aug. 25, 1964     H. L. SMITH, JR     3,145,980
CONTINUOUS HEAT TREATING METHOD AND APPARATUS
Filed Dec. 31, 1962     4 Sheets-Sheet 2

INVENTOR
Horace L. Smith, Jr.

BY

ATTORNEYS

Aug. 25, 1964  H. L. SMITH, JR  3,145,980
CONTINUOUS HEAT TREATING METHOD AND APPARATUS
Filed Dec. 31, 1962  4 Sheets-Sheet 4

INVENTOR
Horace L. Smith, Jr.
BY
ATTORNEYS 3,145,980
CONTINUOUS HEAT TREATING METHOD
AND APPARATUS
Horace L. Smith, Jr., Richmond, Va., assignor to Hupp
 Corporation, Cleveland, Ohio, a corporation of Virginia
Filed Dec. 31, 1962, Ser. No. 248,723
27 Claims. (Cl. 263—36)

This invention relates to a process and apparatus for continuously producing endothermic reactions, for drying a fluidized powdered material or for merely uniformly heating materials. The invention, however, as described and illustrated has particular reference to the continuous process of and apparatus for calcinating raw gypsum for the production of plaster.

The time honored method of achieving the calcination of gypsum has been by heating batches of the raw material in kettles at a prescribed temperature for a prescribed length of time. This method is not particularly economical either of time or of fuel. Time is lost in the filling and emptying of the kettle. Fuel is wasted in the discontinuous operation of the furnace caused by the interruption of the heating during the filling and emptying. This has led those working in the art to seek a new and more economical continuous process of producing calcination and one for producing a greater uniformity in the final product.

Various attempts have been made to obtain a satisfactory continuous process but no such process has been produced. While a certain degree of continuous operation has been attained, new problems have been introduced that have prevented the attainment of uniformity of the final product.

One of the earlier attempts to produce a continuous process, as represented by the patent to Gough Patent No. 1,905,089, consists of feeding in pulverized raw gypsum to the bottom of a kettle, heated by combustion gases. The continuous feed of the raw materials forces the material upwardly through the kettle, it being continuously heated as its ascends. At the top of the kettle the material spills over to be conveyed into one of a plurality of batch kettles where the further processing is continued.

Even though the mass of the material is continuously stirred as it ascends through the kettle, it is difficult because of the large bulk handled and the low heat conductivity of the material, to attain a uniform temperature throughout the mass of the material. A still further disadvantage is that the evolved vapors pass up through the mass of the materials, moistening the material and preventing the attainment of sufficiently high temperature without excessive firing of the furnace. The need to provide batch kettles to finish the process also makes the process only partly continuous.

Another example of an attempt to provide a satisfactory continuous process, as represented by the patent to Zvejnieks Patent No. 2,934,328, also introduces raw material into the bottom of a chamber heated by combustion products. The heat is supplied to the interior of the material mass by fire tubes extending vertically through the chamber. Again the material is forced upwardly through the chamber and heated while moving upwardly. The vapors evolved from the material again pass up through the mass of the material. In this structure, the combustion gases are passed over the batch of the material to mingle with the vapors and the material, and the gases, vapor and material are passed into a separator where the vapors and gases are separated from the materials.

This structure like the previous one discussed will not produce a uniform product for the same reasons as the previous structure fails to do so. It does eliminate the need for the batch kettles, but introduces less control over the final product because of the difficulty of accurately controlling the temperatures of the combustion gases.

A still further attempt is exemplified by the patent to McEntee, Patent No. 2,953,365, FIGURES 1 to 4. In this structure the raw materials are fed in at the top of the chamber and the calcined material is removed from the bottom of the chamber. Heat is supplied by combustion gases passing up through vertically positioned tubes. While this structure reverses the flow of evolved vapors so that they flow through the raw materials instead of through the processed materials, the uniformity of final product is still not attained to the degree that is satisfactory.

In each of the foregoing examples, heat is supplied by combustion gases the temperature of which is difficult to maintain constant. The uniformity of the process of calcination is difficult to control because there is no uniformity of temperature in the mass of material. Each guantum of the material discharged from the chambers possesses a different degree of calcination, some being over calcinated and others being under calcinated.

The principal object of the present invention is to obviate the disadvantages present in the prior attempts to obtain a continuous process for treating a material to change its chemical character.

A further object is to provide a novel continuous process for treating a material by subjecting a relatively thin layer of such material to a source of heat thereby attaining uniformity of temperature throughout the layer; by supplying the heat in a form enabling the ready control of the temperature with an exactness required of the process and simultaneously eliminating contamination of the product by products of combustion; by stirring the material in the layer during the heating to remove and disperse any hot spots that might be caused by localized high density spots; and finally, by providing for the removal of the materials from the source of heat after a period of time exactly controlled to attain the proper degree of calcination.

Another object of the invention is to provide a continuous process for calcination of gypsum that is more economical of fuel and one more economical of space requirements.

Another object of the invention is to provide novel apparatus for producing endothermic reactions involving the application of heat to or removal of heat from a material for a precise length of time and in such a manner that the mass of the material is everywhere given this same effective heat treatment.

A further object of the invention is to provide a novel method and apparatus for continuous calcination or partial dehydration of pulverized raw gypsum useful in forming gypsum plaster.

Yet a further object of the invention is to provide novel apparatus that accommodates the release of vapors arising through a relatively small thickness of material to be dehydrated so as to avoid interference with the maintenance of the desired temperature in the material mass.

A further object of the invention is to provide a novel pulverized material distributing means, a novel agitating means for effecting an overturn of the material while in a heat conductive relation to a heated surface and while exposed to radiant heat, and a novel means for removal of the processed material after an accurately controlled time interval.

A still further object of the invention is to provide in a continuous process for heat treatment of a material to change its chemical character, an improved apparatus for effecting a cooling step, wherein the treated materials are cooled and dried to be stored or bagged.

These and other objects of the invention will become more fully apparent from the claims, and from the description as it proceeds in connection with the drawings wherein;

FIGURE 5 is a view in elevation and partly in section disclosing a means for cooling the materials as they emerge from the heat treating apparatus.

Referring to the drawings, a gypsum calcining apparatus illustrative of the present invention may be in a casing 12 having a cylindrical side wall 14 supported by peripherally spaced, vertically disposed beams 16. The upper end of casing 12 may be closed by a conically shaped roof 18 having a stack 20 or outlet at its apex for exhausting gaseous fluids from casing 12. The casing side walls and their supporting beams may be supported upon a suitable foundation 22 in which may be provided an annular gutter or trench 24 which at one point 26 empties into bore 28. The side walls 14 of the casing enclose the outer edge of trench 24.

Figure 2:
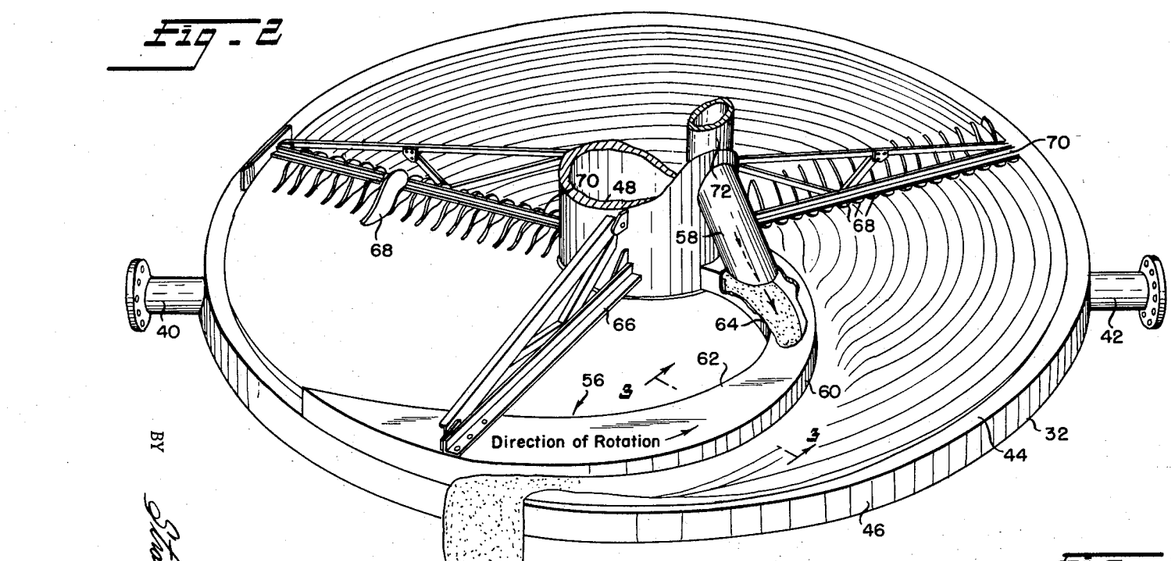
FIGURE 2 is a view in perspective, partly in section of the top of one of the platens showing the screeding and sweeping arm and plow arms.

Casing 12 is divided vertically by a plurality of decks or platens 32 having concentric or aligned central circular openings 34 and an outer diameter less than that of the interior of side wall 14 to provide an annular space 36 between the periphery of deck 32 and the inside wall of the casing. Decks 32 are formed as best shown in FIGURE 2 as platens with hollow interiors 38 that may have sinous channels for the conduction of fluid therein. Each deck or platen 32 is provided with a supply connection 40 and an exhaust connection 42. These connections are made to a heat exchanger and pumping system for the circulation of a heating fluid in the platen. As the heating system details form no part of the present invention, the details of the heat exchanger system are not shown here, but reference is made to my copending application Serial No. 118,435, filed June 20, 1961, now abandoned, for a complete disclosure of a suitable system that may be used with the present invention.

Platens 32 provide upper and lower heating surfaces 44, 46 to which the fluid conducts heat and from which heat is given up to the material to be heated.

Referring again to FIGURE 1, vertically erected through the aligned circular holes 34 in the decks 32 is a cylindrical tube 48 which is supported for rotation about its axis by flanged wheels 50 journalled in brackets 52 fixed to a plate 51 and in turn connected by angles or brackets 53 affixed to the exterior wall of tube 48. Wheels 50 are peripherally spaced around tube 48 on plate 51 in sufficient number to carry the weight of the tube and its appendages. Flanged wheels 50 are adapted to roll on a circular track or rail 54 located below the base plane of the casing 12.

Tube 48 provides a rotatable structure for transporting various arms for depositing material upon the upper surface of platens 32, for agitating or overturning the material and for removing the material from the platens when it has resided there for sufficient length of time for the proper amount of heat transfer to be attained. For a further detailed consideration of this structure reference is again made to FIGURE 2.

Figure 3:
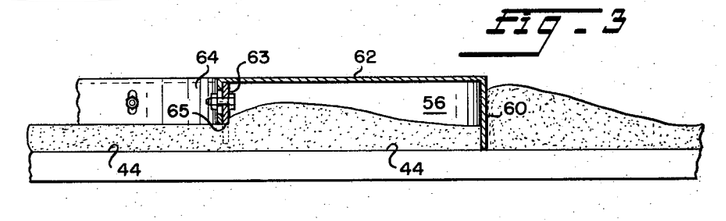
FIGURE 3 is a cross-sectional view on line 3—3 of FIGURE 2 showing the structure of the screeding and sweeping arm.

Each platen 32, except the extreme upper platen, has an associated plow, spreading and sweeping means. The spreading and sweeping means is combined in a unitary structure and a reversely curved sweep arm 56 to which is connected a tube 58 for transporting the materials to be heated. As shown in FIGURE 3, arm 56 is constructed with a leading wall 60 that rests upon and slides on to scrape the top surface 44 of the platen. Leading wall 60 is connected to a horizontal top wall 62 which in turn is connected to the trailing wall 64, the bottom edge 65 of which is spaced from the top surface 44 of the platen whereby fluidized or particle material from within arm 56 will be spread evenly upon upper surface 44 and to a thickness determined by the distance lower edge 65 is spaced from upper platen surface 44. The outer end of the reversely curved arm 56 is supported by a cantilever arm 66 that may be fabricated of angle iron. The inner ends of the cantilever arms are affixed to cylinder 48.

When tube 48 turns, reversely curved arm 56 moves over the upper surface of the platen. The leading wall 60 of the arm 56 serves to sweep all material from the top surface 44 of the platen and cause it to be moved radially outwardly and over the edge of the platen from which it spills into the annular trench 24 at the base of the casing. Simultaneously, raw materials enter the space between walls 60 and 64 from pipe 58 and fall upon the upper surface of the inner portion of the platens. The reversed curved wall 64, being spaced from the upper surface 44 of the platen, engages the deposited material and causes it to be propelled toward the outer peripheral edge of the platen and to spread in a layer of uniform thickness over the entire upper surface 44 of the platen 32. The screed, as it moves relative to the upper surface 44 of the platen, performs the two operations, of spreading the material in a uniform layer thereon and of sweeping materials previously spread thereon during a preceding pass of the screed over the surface.

The material occupying nearly the entire upper surface 44 of the platen has heat transmitted to it from below by conduction and by radiation. Except for the width of the top wall 62 of arm 56 and the horizontal cross-sections of other arms 66, the entire upper surface of the platen and material is exposed to radiant heat from the platen above. Heat will be therefore directed through the layer of material from both below and from above, to penetrate the entire distance through the layer and bring all parts of the layer to the same temperature.

To assist this penetration and to prevent localized hot spots in the material that may be due to non-uniformity of the density of the layer it is desirable to agitate the layer as by turning it over and redistributing it upon surface 44 during the heating step. This may be accomplished by plows 68 fixed to and equally spaced along two cantilever arms 70 peripherally spaced from each other and from arm 66 supporting screed 56. While plows 68 are illustrated as an example of such means, other equivalent stirring means such as discs or paddles may be used. Plows 68 slide upon the upper surface of the platen and operate to turn over by reversing the upper and lower portions of the material in the layer and redepositing the material in substantially the same location on the surface 44. This operation causes dispersal of any hot spots due to a possible non-homogeneous density distribution within the layer and permits the heat to penetrate to every particle of the layer.

The thickness of the layer of material upon the surface may be made commensurate with the heat conducting characteristics of the material, so that the heat rapidly penetrates the layer to heat it to the temperature necessary to effect the desired reaction. The thickness of the layer can be varied by changing the height of lower edge 65 of trailing wall 64 above surface 44. For this purpose wall 64 may be fitted with a slidable portion 63 bolted to it through elongated vertically disposed slots in wall 64.

Each of screed arms 56 has its individual supply pipe 58 that passes through the tube 48, and connects to a vertically extending pipe 72 within tube 48. The materials move in pipe 72 partially by gravity and partially by forced feed.

Figure 4:
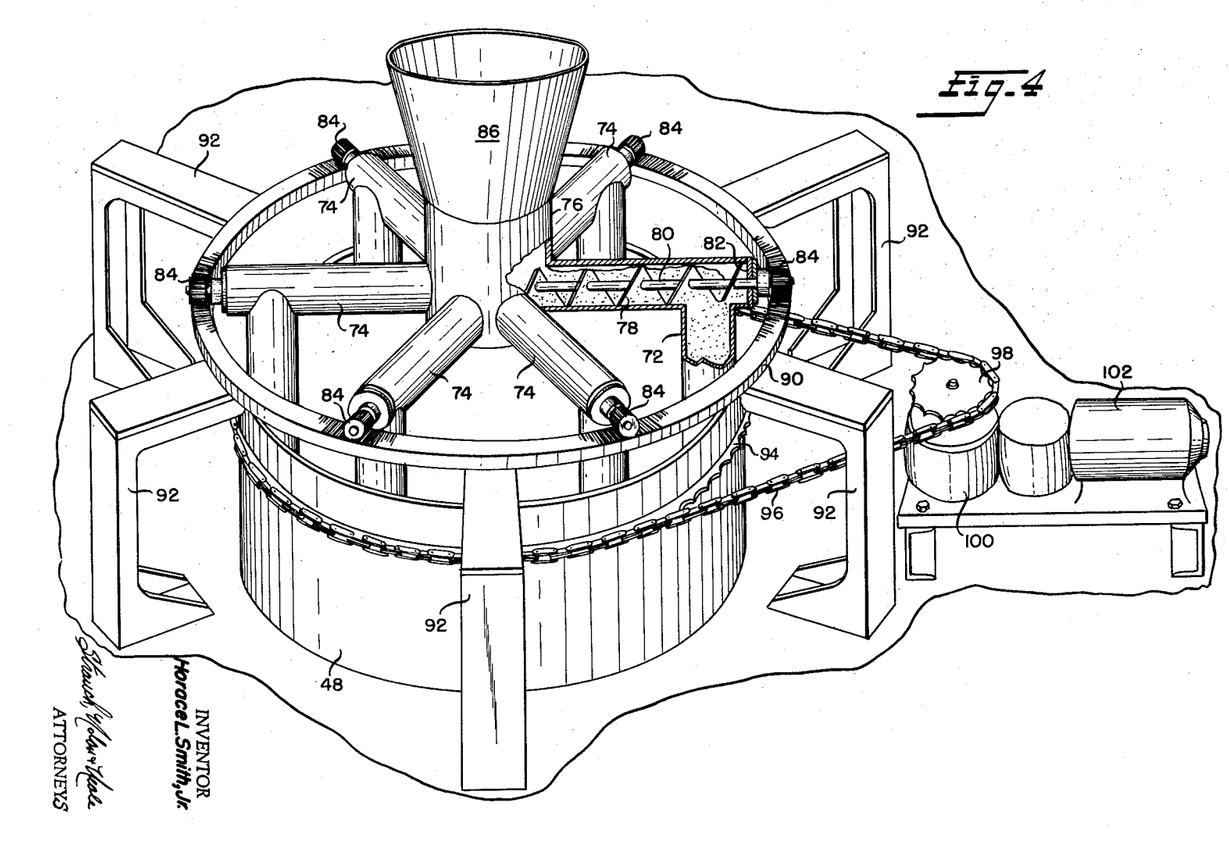
FIGURE 4 is a view in perspective, partly in section, showing supplying means for feeding a raw material such as gypsum to the platens, and means for driving the material feeding mechanism.
Figure 6:
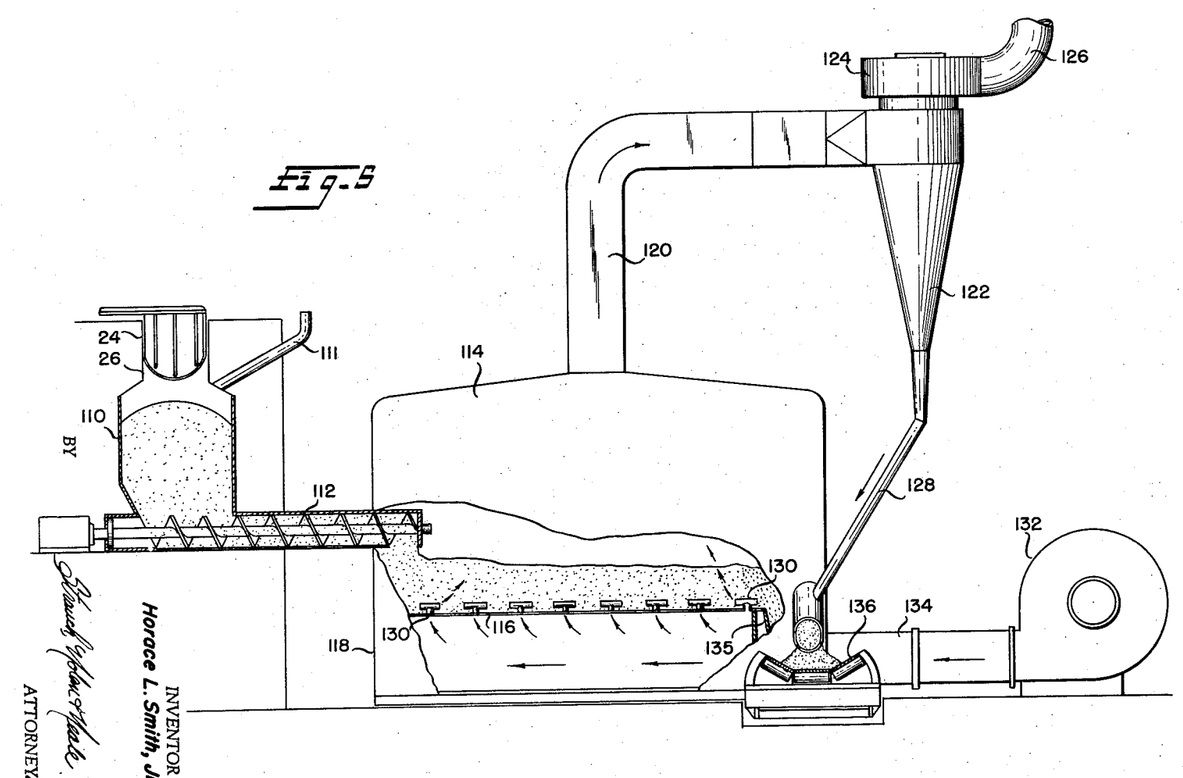

For the details of the means for supplying pipes 72 with materials for driving the tube 48 reference is now made to FIGURE 4.

Each pipe 72 is connected at its upper end to the outer end of a radially extending distributor pipe 74, the inner end of which is connected to a manifold 76. Each pipe 74 encloses a screw type conveyor means for moving the raw materials from the manifold 76 to the upper ends of pipes 72. The screw type conveyor 78 is mounted on a shaft 80 journalled at one end within the manifold 76 and at the other end in the outer end wall 82 of the pipe 74. The outer end of the shaft 80 is keyed or otherwise fixed to a pinion gear 84. The manifold 76 may be provided with a funnel-shaped portion 86 to which raw materials are supplied from pipe 88 extending through the roof of the casing 12.

Pinion gear 84 engages and meshes with a circular rack 90 mounted on stanchions 92 peripherally disposed about the tube 48. The stanchions 92 are supported by any suitable means within the casing. For example, they may be mounted on and supported by the upper platen or they may be affixed to the interior wall of the casing. When tube 48 is rotated the pinions 84 engaging the rack 90 rotate the screw conveyor to transport materials from manifold 76 to pipes 72, forcing it to move down pipes 72 and 58 into arms 56. Since the conveyor is driven from the same means as the screeds, the material will have a measured flow rate always proportional to the speed of the rotation of the screed.

For removing the collected treated material from the annular trench 24, tube 48 also carries at its lower end a plurality of peripherally spaced cantilever arms 69, the ends of which have paddles 67 fixed thereto, that extend into and have a shape to fit the cross-sectional contour of the trench 24. Rotation of the tube 48 causes said paddles to move in annular trench 24 to scrape and to push the treated material around the trench to the opening 26 in the floor of the trench 24, where the material drops from the annular trench.

The materials dropping from the trench through the openings is in a highly heated and somewhat moist condition. It should be cooled and further dried before it is either sacked or stored in bunkers.

One such cooling means is disclosed in FIGURE 5. In this cooling means, the outlet 26 from the trench 24 is provided with a hopper 110 for collecting the materials discharged from the trench as the result of the operation of the paddles moving along the trench. A vent 111 extends from the upper side of hopper 110 to permit removal of moisture from the hot calcined gypsum. Hopper 110 is connected at its lower end to screw type conveyor 112 driven by any suitable drive means. The conveyor 112 extends from the point below the hopper 110 to a point interior of a reactor 114 and the outer end of the conveyor 112 discharges the materials upon a cooling platen 116.

The reactor 114 comprises a casing 118 forming a chamber divided into upper and lower chambers by plate 116. The upper part of casing 118 is connected to a pipe 120 and through it to a cyclone separator 122. Separator 122 is connected at its upper end through an induction blower 124 to a stack 126 through which the gases in the reactor 114 are removed. The cyclone separator 122 separates the fine materials that might be entrained with the gases, and discharges such materials from its lower end through tube 128.

Extending through plate 116 are a plurality of T-shaped fixtures 130 having hollow interiors through which cool air may enter the mass of the materials spread on plate 116. Cooling air is supplied under pressure to the chamber below plate 116 as by a blower 132 connected to the lower chamber by conduit 134. Air supplied to the lower chamber forces its way up through the powdery fluid material particles on plate 116 cooling the materials and maintaining the materials in a highly fluid and agitated state. The cool air contacts the particles to cool them and to evaporate the moisture which is carried off as vapor.

The material on plate 116, being in a highly fluid state, naturally seeks its own level. In so doing, the material spills over the edge 135 in a cooled state, upon a belt conveyor 136 by which it may be conveyed to bins or a sacking room as desired. The lower end of pipe 128 leading from the cyclone separator also discharges upon conveyor 136.

As previously described, tube 48 which carries screed arms 66 and plows 68 is continuously rotated, for continuously distributing the raw material upon surface 44, for stirring the material and for sweeping the treated material from the platen.

For rotating tube 48 about its axis, the exterior of the tube 48 may be provided with a sprocket 94 affixed thereto. Sprocket 94 may be engaged by a sprocket chain 96 that is driven by a sprocket wheel 98. Sprocket wheel in turn is affixed to a shaft driven by any suitable means, herein illustrated as a variable speed transmission 100, connected to an electric motor 102. Any type of variable speed transmission may be used so long as it provides for a suitable range of operating speeds commensurate with the use to which the apparatus is to be put.

The angular speed of the arms driven by tube 48 determines the length of time the material remains upon the platen in exposure to the heat. Time and temperature in most of such processes are complementary. For calcining gypsum, a minimum temperature of 262° F. is required to be maintained in the mass of the material to convert the dehydrate to hemihydrate. When the temperature is raised to a value in the range of 500° F. to 800° F., the time which the mass of the material remains exposed to the heat is correspondingly shortened. As a consequence the rate of drive of tube 48 bears a definite relation to the temperature of the material, and an exact control of the speed is important to the optimum operation of the calcinating process.

For calcining gypsum, the reaction can be written as follows:

|  | $CaSO_4-2H_2O$ Dihydrate | Heat | $CaSO_4-\frac{1}{2}H_2O$ Hemihydrate | $+3/2H_2O$ Water |
|---|---|---|---|---|
| Molecular Wt | 172.17 |  | 145.15 | 27.024 |
| Sp. Gr | 0.92 |  | 0.78 |  |

It is generally regarded by some skilled in this art that the heat of hydration of casting plaster indicates that it is composed almost entirely of the alpha hemihydrate. The heat of hydration of hard-wall plaster indicates it contains approximately 25% beta hemihydrate and 75° alpha hemihydrate. Beta-hemihydrate is an important constituent of commercial wall plasters, probably because at some stage of the calcining process a saturated steam atmosphere does not prevail. Plasters containing approximately 25% of the beta variety have markedly different properties from those consisting essentially of the more stable alpha-hemihydrate.

In the design of a commercial scale continuous calciner as contemplated by the present invention the atmosphere in the calcine may be carefully controlled. The alpha-hemihydrate is formed in a saturated steam atmosphere and the beta is formed in an air atmosphere. In the embodiment illustrated, the outer walls are generally air tight and the atmosphere will be substantially composed of saturated steam.

One way to determine if the hemihydrate has been formed from the dihydrate is to collect all the sample and determine the weight loss or measure the specific gravity of a sample. To determine if a satisfactory hard wall plaster has been made, add the water back and make a functional test.

There are definite temperature breaks going from the dihydrate to the hemihydrate to the anhydrous. Reference may be made to U.S. Patent No. 2,479,576 to Karrick for a more detailed explanation. The dihydate goes to the hemihydrate at 128° C. (262° F.) and to the anhydrous at 163° C. (325° F.). Using a 600° F. temperature for a few minutes retention time will not be sufficient to form an insoluble anhydrate.

To arrive at the total heat required per unit weight certain assumptions must be made. If feed and discharge temperatures of 84° F. and 260° F. are used, the heat input to the process is about $5.48 \times 10^5$ B.t.u./ton. To this must be added heat losses to the atmosphere. Based on 50 tons/hr., the process requires about 27,400,000 B.t.u./hr. minimum.

Using a specific gravity of 0.92 or a density of 57.4 lbs./cu. ft. for the dihydrate, the system should handle 1,745 cu. ft./hr. If this is spread to ¼″ thickness and the system designed for a 5 minute retention time, 7,000 sq. ft. of surface is required from a volume standpoint. About 22 decks of platens 32 each 20 feet in diameter may be used.

From a heat transfer standpoint it is necessary to transfer about 3,920 B.t.u./sq. ft./hr., assuming 7,000 sq. ft. of surface. This may be provided with a liquid temperature at about 600° F. provided the mass is agitated with the platen construction as shown in my earlier application identified above.

It is known that the thermal conductivity of powdered gypsum at 70° F. is about 0.047 B.t.u./ft./hr./°F. at an apparent density of 26–34 lbs./cu./ft. At this density it would be a good insulating material. Hot plate tests showed the material on the hot plate to have very good insulating properties. It acted well when moved around gently on the hot plate but caked slightly when left in a stagnant layer. When the material next to the hot surface had formed the hemihydrate, it insulated the material, but when moved around so that dihydrate reached the plate and gave up its water of hydration as steam, the fluidized movement could be seen. There was not enough of a density change so that the heavier hydrate would sink through the hemihydrate to the heated surface on the plate without mechanical agitation or stirring.

Figure 1:
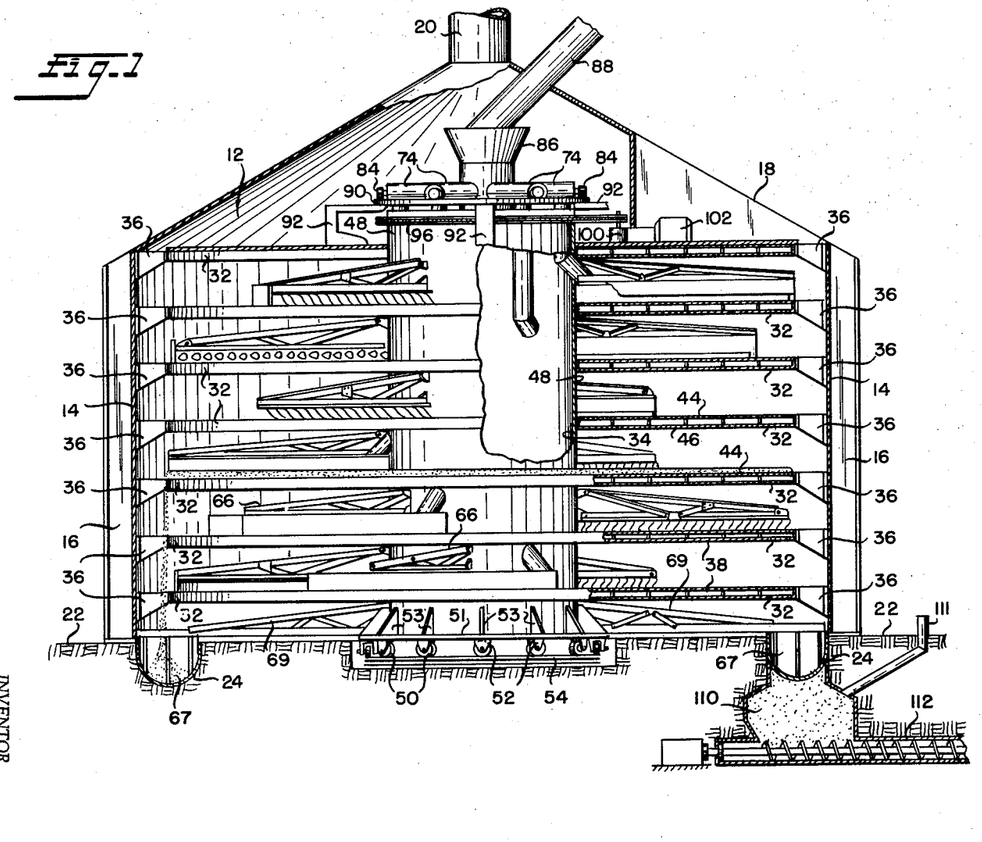
FIGURE 1 is a side elevation partly in section showing a preferred form of the invention.

The mode of operation of the apparatus for the calcining of gypsum thus is that as the raw gypsum material is fed to the manifold 76 and fed through distributor pipes 74, it flows by gravity down pipes 72 into the space in screed arms 56 as defined by leading and trailing boundary walls 60, 64 thereof. As tube 48 is rotated counterclockwise as seen in FIGURES 1 and 2, arm 56 sweeps the entire surface of the platen and the material is distributed in a uniform and thin layer on the upper surface 44 thereof. Following screed arm 56 are the plows 68 which agitate or turn over the material of the layer so that other parts of the mass come into direct contact with the top surface of the platen 44. In one revolution of screed arm 56, leading edge 60 thereof which slides on upper surface 44 of the plate, engages the previously spread material and sweeps it toward the peripheral edge of the platen where it spills over into annular trench 24.

While the material resides on upper surface 44 of platen 32, it is subjected to high temperature heat from below by conduction and radiation and by radiation from above, i.e. the underside of the next upper platen. The rotational speed of the tube 48 may be adjusted so that at the temperature of operation the material spilling over is completely in a hemihydrate state.

The material as it spills over the edge of the platens is in a highly heated condition and may be moved therefrom by the conveyor by which it is conveyed to the exterior of the casing 12, to coolers and then to the sacking room.

While the foregoing description has been directed to the use of the apparatus for the calcining of gypsum, the apparatus may also be used for heat treatment of other materials.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A continuous process for heat treating a material in a structure having a plate disposed in a treatment chamber and formed with a material support surface bounded by an outer continuous peripheral edge, said continuous process comprising the steps of:
    (a) continuously supplying and distributing the material to be treated in a thin layer of uniform thickness upon said supporting surface,
    (b) continuously supplying heat to said thin layer from both above and below said surface to cause the heat to penetrate the layer from its two sides and heat the layer to a substantially uniform temperature throughout,
    (c) continuously overturning the distributed material simultaneously with the supply and distribution of untreated material to retard the formation of hot spots in said layer and further to increase the uniformity of the temperature of the material, and
    (d) removing said material in said layer in a continuous stream simultaneously with the supply and distribution of untreated material to said support surface, the removal of material being effected by sweeping said material over said peripheral edge after it has been on said support surface for a predetermined period of time.

2. The process as claimed in claim 1, further subjecting the removed materials to a forced flow of relatively cool air to cool said materials.

3. A continuous process for heat treating a material to change its chemical character comprising the steps of:
    (a) continuously spreading said material in a thin layer of uniform thickness upon a flat surface having a circular peripheral edge in repeated passes over said surface;
    (b) heating the material in said layer continuously from above and below said surface to a temperature in excess of the minimum temperature at which said chemical action is initiated;
    (c) continuously plowing the material in said layer during each pass over said surface;
    (d) continuously sweeping the material of the layer over the circular peripheral edge of said surface after it has remained on said surface for a complete pass over said surface; and
    (e) controlling the speed of the passes over said annular surface so that the material remains on said surface for the period required for the chemical change to be completed.

4. A process for calcining gypsum comprising the steps of:
    (a) continuously spreading said gypsum in a thin layer of uniform thickness upon a flat surface having a circular peripheral edge in repeated passes over said surface;
    (b) continuously heating the gypsum in said layer from above and below said annular surface to a temperature greatly in excess of the minimum temperature at which calcination is initiated;

(c) continuously plowing the layer to overturn the gypsum at least once during each pass over said surface;

(d) continuously sweeping the gypsum from said surface after it has remained on said surface for one pass over said surface; and (e) controlling the speed of the passes over said annular surface to permit the gypsum to remain on said annular surface for the period required for the degree of calcining desired in the gypsum to be attained.

5. The process as claimed in claim 4 comprising the additional step of blowing a cooling fluid through said calcined gypsum to remove heat and moisture remaining in the gypsum.

6. The process as claimed in claim 4 comprising the further steps of:

(a) spreading the swept gypsum in a fluidized layer on to an additional surface;

(b) blowing a cool, dry air through said layer to agitate the layer and to remove the heat and moisture from said gypsum; and (c) separating the gypsum and cooling air, and removing them separately.

7. A process for calcining gypsum comprising the steps of:

(a) progressively spreading gypsum in a thin layer of uniform thickness upon a supporting surface of endless extent;

(b) continuously supplying heat to said layer of gypsum at a temperture in excess of the minimum temperature at which calcination is initiated;

(c) plowing the gypsum in said layer simultaneously with the supply and spreading of untreated material on said supporting surface to overturn the layer at least once during the time it remains on said supporting surface;

(d) progressively sweeping the gypsum from the supporting surface after it has been permitted to remain there for a period of time, said gypsum being swept from said supporting surface simultaneously with the spreading of untreated material thereon; and (e) controlling the time period in which the gypsum is permitted to remain on said supporting surface commensurate with the temperature at which the gypsum is maintained so as to produce the desire degree of calcium in the gypsum.

8. Apparatus for heat treating a material in a continuous process comprising:

(a) means providing an enclosed chamber;

(b) means within the chamber providing upper and lower heating surfaces from which heat is uniformly transmitted.

(c) spreading means associated with said upper surface and movable with respect thereto for continuously spreading the materials to be treated thereon in a layer of uniform thickness;

(d) plow means movable relative to and engaging said surface at a fixed distance behind said spreading means for overturning and redistributing the material in said layer upon said upper surface; and (e) sweep means movable relative to and engaging said surface at a fixed distance behind said spreading and plow means to permit the materials to be completely heat treated, for sweeping the materials from said surface.

9. Apparatus as claimed in claim 8 further including:

(a) means for continuously supplying raw gypsum to said spreading means at a pre-selected rate of flow; and (b) means for collecting the treated material swept from said support means and moving it from said chamber.

10. Apparatus as claimed in claim 9 wherein the material collecting and removal means comprises a trough surrounding said support means, and means movable in said trough for transporting the material to an outlet.

11. Apparatus for treating a material in a continuous process comprising:

(a) means forming a chamber having a central member mounted for rotation;

(b) a plurality of vertically spaced platens enclosed in said chamber stationary relative to said central member, said platens having a central opening surrounding said central member and providing vertically aligned upper and lower heat radiating surfaces;

(c) means for delivering material to be treated from the exterior of said chamber to the spaces between said platens;

(d) spreading means mounted to turn with said central member and movable relative to the upper heating surface of said platens for spreading said material in a thin layer of uniform thickness thereon;

(e) plow means mounted to turn with said central member and movable over said upper heating surface behind said spreading means for overturning and redistributing the material upon said upper heating surface to prevent the formation of hot spots in the material and to enable the ready penetration of heat; and (f) sweep means mounted to turn with said central member and movable relative to said upper heating surface behind said plow and spreading means, for sweeping the heat treated material from the upper heating surface over its outer side edge.

12. Apparatus as claimed in claim 11 further comprising means for drive connecting said delivery, spreading, plow and sweep means to said central member to move at a predetermined speed to permit the regulation of the period of time in which the material remains subjected to the supply of heat.

13. Apparatus as claimed in claim 11 further comprising:

(a) means for collecting and removing said treated material from said chamber; and (b) means receiving said treated material for removing the heat and evolved moisture therefrom.

14. Apparatus as claimed in claim 11 wherein said means for delivering said material to be treated from the exterior of said chamber to the spaces between said platens comprises:

(a) a supply pipe penetrating the chamber and leading to a point centrally in the upper portion thereof;

(b) manifold positioned beneath the end of said pipe to receive the discharge therefrom;

(c) distributing pipes radiating from said manifold connected at their inner ends with said manifold;

(d) further pipes connected to the outer ends of said distributing pipes one each connecting at their lower ends with the space between said platens;

(e) a screw type conveyor within each of said distributing pipes for moving the gypsum from said manifold to said further pipes, said conveyor having a shaft penetrating the outer ends of said distributing pipes;

(f) a pinion gear fixed to the outer end of said shaft;

(g) a circular rack engaging each of said pinion gears; and (h) means for causing said pinion gears to move relative to said rack for driving said conveyors.

15. Apparatus as claimed in claim 11 wherein said spreading and sweeping means comprises a pair of reversedly directed leading and trailing walls joined together by a top wall, the leading wall being arranged to engage and slide upon the upper heat radiating surface of the platens, the trailing wall being spaced from the upper heat radiating surface of the associated platen to permit the spreading of gypsum in a layer of uniform thickness upon said upper heat radiating surfaces.

16. Apparatus as claimed in claim 11 wherein said means for collecting and removing said treated material from said chamber comprises:
   (a) a trench for receiving the gypsum swept from said platens;
   (b) means movable in the trench for transporting said gypsum along said trench;
   (c) discharge means at one point in the bottom of said trench through which the collected gypsum may drop;
   (d) means beneath said discharge means for conveying said gypsum from said chamber; and
   (e) means connected to said conveyor for receiving said gypsum for removing the heat and moisture therefrom.

17. Apparatus as claimed in claim 11 wherein said means receiving treated material for removing the heat and evolved moisture therefrom comprises:
   (a) a casing forming a chamber;
   (b) a support plate dividing said chamber into an upper portion for receiving the material to be cooled and a lower portion for a cooling fluid, there being a plurality of apertures in said plate connecting said upper and lower portions of said chamber;
   (c) means connected with the lower portion of said chamber for supplying a cooling fluid thereto under pressure;
   (d) means communicating with the upper portion of said chamber for separating the entrained material particles from said cooling fluid and for separately conveying each from said chamber; and
   (e) means for conveying said cooled material from said chamber.

18. Apparatus for calcining gypsum comprising:
   (a) means providing a chamber having an opening for receiving raw gypsum to be treated and a discharge opening for removal of calcined gypsum;
   (b) a plurality of annular platens vertically disposed in spaced relation in said chamber, each platen providing upper and lower heating surfaces and a centrally disposed aperture, the apertures of the separate platens being aligned;
   (c) a vertically disposed tube rotatably mounted in said aligned apertures;
   (d) means extending between said platens from and fixed to said tube for spreading gypsum upon the upper heating surface of each said platen and for sweeping the upper heating surface clean of all gypsum;
   (e) means carried by said tube and extending between said platens in engagement with the upper surface of said platens for overturning the gypsum thereon, said means being spaced circumferentially about said tube from said spreading and sweeping means;
   (f) means for rotating said tube to cause said material overturning means and said spreading and sweeping means to successively move over said annular surface, and
   (g) means including conduit means fixed within said tube for delivering material to be treated to said upper heating surfaces.

19. Apparatus as claimed in claim 18 wherein said means for rotating said tube comprises:
   (a) a sprocket mounted on and encircling said tube;
   (b) a variable speed transmission means;
   (c) a sprocket wheel on said variable transmission and driven thereby; and
   (d) a sprocket chain engaging said two sprockets for driving said tube from said variable speed transmission.

20. Apparatus for cooling and drying calcined gypsum comprising:
   (a) a casing forming an enclosed chamber;
   (b) plate means dividing said chamber into upper and lower portions and provided with a plurality of apertures therethrough;
   (c) T-shaped conduits mounted on said plate means and connected with the apertures and projecting into the upper portion of said chamber;
   (d) means connected with the lower portion of said chamber for supplying a cooling fluid to said lower portion of said chamber and maintaining a pressure therein;
   (e) means for depositing calcined gypsum on said plate for covering the top surface thereof and the projecting portions of said T-shaped conduits;
   (f) means connected to the upper portions of said chamber for separating the cooling fluid and any entrained gypsum; and
   (g) means for removing and collecting said gypsum accumulating on said plate and the gypsum separated from said cooling fluid in said upper portion of said chamber.

21. Apparatus for treating a material in a continuous process comprising:
   (a) means forming a treatment chamber,
   (b) at least one platen fixed in said chamber and having a substantially horizontally extending material support surface,
   (c) a rigid, rotatably mounted, upstanding member at least partially disposed in said chamber and extending centrally through said platen,
   (d) drive means for continuously rotating said upstanding member about a predetermined axis,
   (e) a first radially extending arm fixed for rotation with said upstanding member for distributing material on said surface in a layer of substantially uniform thickness,
   (f) a second radially extending arm fixed to rotate with said upstanding member in angularly spaced relationship to said first arm and being operable to sweep material off said support surface,
   (g) material feed means, including a power driven mechanism for continuously delivering material to said support surface between said first and second arms, and
   (h) means drivingly connecting said power driven mechanism to said drive means for correlating the rate of material feed with the rotational speed of said rigid member.

22. The apparatus defined in claim 21 wherein said upstanding member is hollow, wherein said power driven mechanism is mounted for rotation with said upstanding member, and wherein said material feed means further includes conduit means for conveying material from said mechanism to said support surface, said conduit means being fixedly mounted within said upstanding member.

23. The apparatus defined in claim 22 wherein said power driven mechanism comprises a screw conveyor mounted above said support surface exteriorly of said chamber.

24. Apparatus for treating a material in a continuous process comprising:
   (a) means forming a treatment chamber,
   (b) at least one platen fixed in said chamber and having a substantially horizontally extending material support surface,
   (c) a rigid rotatably mounted, upstanding, hollow member at least partially disposed in said chamber and extending centrally through said platen,
   (d) drive means for continuously rotating said hollow member about a predetermined axis,
   (e) a first radially extending arm fixed for rotation with said hollow member for distributing material on said surface in a layer of substantially uniform thickness,
   (f) a second radially extending arm fixed to rotate with said hollow member in fixed angularly spaced relationship to said first arm and being operable to sweep material off said support surface, and
   (g) material feed means comprising conduit means fixedly mounted in said hollow member for continuously delivering material to said support surface between said first and second arms.

25. Apparatus for treating a material in a continuous process comprising:
   (a) means forming a treatment chamber,
   (b) at least one platen fixed in said chamber and having a substantially horizontally extending material support surface,
   (c) a rigid, rotatably mounted, upstanding member at least partially disposed in said chamber and extending centrally through said platen,
   (d) drive means for continuously rotating said rigid member about a predetermined axis,
   (e) a first radially extending arm fixed for rotation with said rigid member and extending over said support surface for distributing material on said surface in a layer of substantially uniform thickness,
   (f) plow means fixed to said rigid member for rotation therewith in fixed angularly spaced relation to said first arm, said plow means extending radially from said member and over said support surface for overturning and redistributing the material on said surface,
   (g) a second radially extending arm fixed to rotate with said rigid member in fixed agularly spaced relationship between said plow means and said first arm, said second arm extending over said support surface for sweeping material on said surface in a continuous stream over the outer peripheral edge of said platen, and
   (h) means for continuously feeding material to said support surface between said first and second arms.

26. The apparatus defined in claim 25 comprising means for vertically adjusting said first arm relative to said support surface for selectively varying the thickness of said layer.

27. The apparatus defined in claim 25 comprising
   (a) an upwardly open annular trough disposed vertically below the outer peripheral edge of said platen for receiving material swept off by said second arm,
   (b) means providing an outlet for removing material from said trough, and
   (c) means fixed for rotation with said rigid member for conveying material in said trough to said outlet.

References Cited in the file of this patent
UNITED STATES PATENTS

| | | |
|---|---|---|
| 712,343 | Sudre et al. | Oct. 28, 1902 |
| 730,564 | Perkins | June 9, 1903 |
| 961,081 | Barker | June 7, 1910 |
| 1,879,680 | Hartley et al. | Sept. 27, 1947 |
| 2,421,120 | Griswold et al. | May 27, 1947 |
| 2,821,375 | Andrews | Jan. 28, 1958 |
| 2,834,119 | Schaub | May 13, 1958 |
| 3,058,236 | Lassait | Oct. 16, 1962 |